Oct. 13, 1953

J. V. HART ET AL 2,655,045

MERCURY MANOMETER

Filed Nov. 6, 1948

INVENTORS.
JOHN V. HART
EARL E. LAKJER

BY Arthur H. Swanson

ATTORNEY.

Patented Oct. 13, 1953

2,655,045

UNITED STATES PATENT OFFICE 2,655,045

MERCURY MANOMETER

John V. Hart, Havertown, and Earl E. Lakjer, Philadelphia, Pa., assignors, by mesne assignments, to Minneapolis-Honeywell Regulator Company, Minneapolis, Minn., a corporation of Delaware Application November 6, 1948, Serial No. 58,642

3 Claims. (Cl. 73—401)

This invention relates to a gauge for measuring pressure.

It is an object of this invention to provide a manometer or U-shaped elongated conduit having a long, vertically-extending glass tube in which travels a free surface of the mercury. This tube may be provided on its front and rear with a series of etched lines which establish a series of horizontally aligned gauge marks.

It is a further object of this invention to provide a float on the free surface of the mercury within the tube. This float preferably is a sphere of suitable size so that the mercury centers the spherical float in the tube out of contact with the inner walls of the tube.

Yet another object of this invention is to provide a cabinet or housing in which the manometer including its long tube is completely enclosed. This cabinet has in its front surface a narrow vertical slit parallel to the tube and through which the tube is visible. Within the cabinet and behind the tube is a sheet of ground glass. A long fluorescent electric light is mounted in the cabinet behind a baffle wall which prevents the direct rays of light from the lamp from passing in a straight line to the tube or to the slot. Instead, this baffle wall causes the light from the lamp to be reflected from the inner surface of the cabinet through the ground glass sheet and through or around the glass tube and the float travelling therein.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
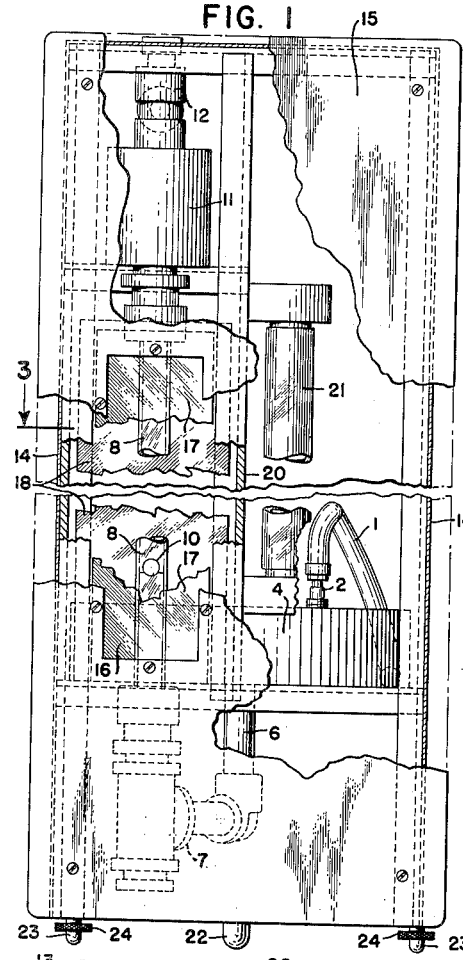
Figure 1 is a front elevation.
Figure 2:
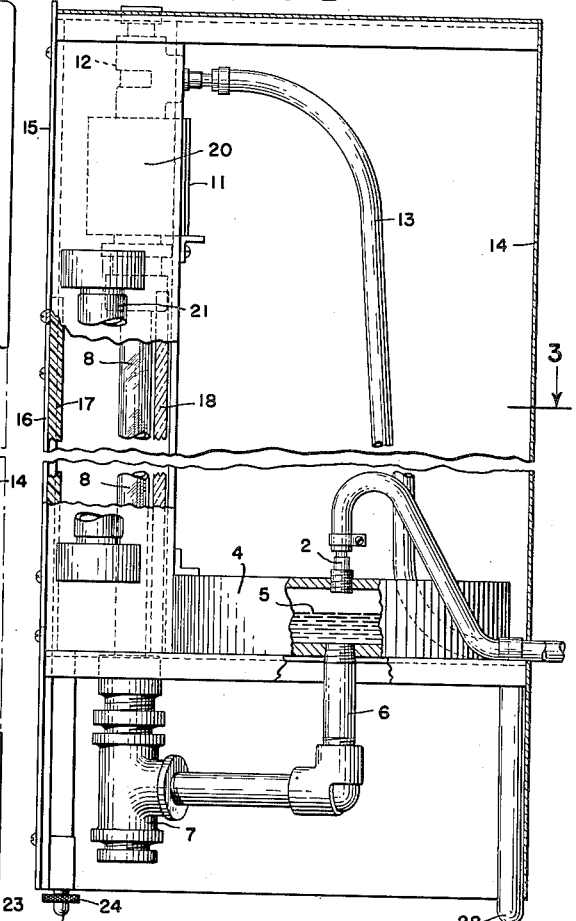
Figure 2 is a side elevation.

Figures 1 and 2 have been cut horizontally to permit illustration on an increased scale and have the outer walls of the housing broken away to expose the inner parts and have parts shown in vertical cross section.

Figure 3:
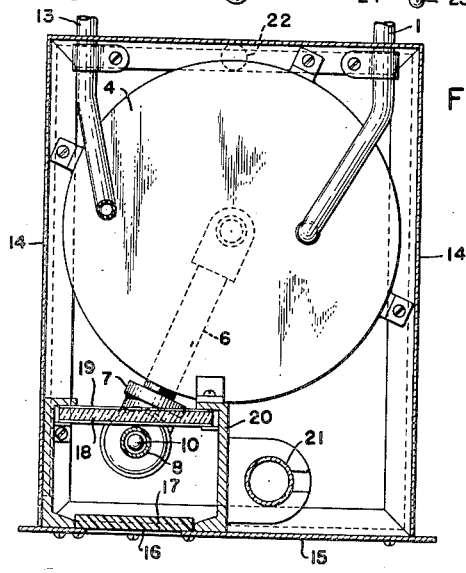

Figure 3 is a horizontal cross section on line 3—3 of Figures 1 and 2 viewed in the direction of the arrows.

Figure 4:
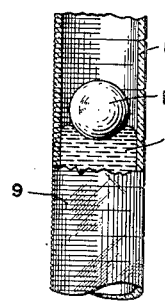

Figure 4 is a front elevation on an enlarged scale of a portion of the tube and float with parts in vertical cross section.

Figure 5:
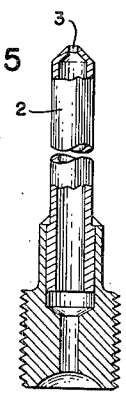

Figure 5 is a vertical cross section through the fitting through which the pressure is applied.

A flexible tube 1 provides means by which the pressure to be measured can be applied to one end of the U-shaped manometer conduit. At its inner end, tube 1 communicates with a hollow fitting 2. Fitting 2 is shown in greater detail in Fig. 5 wherein it will be seen that the fitting 2 has a very narrow opening 3 through it so that fitting 2 forms a baffle or narrow cross section thereby preventing escape of mercury from the manometer when the pressure to be measured is cut off.

Fitting 2 is mounted in the top of a hollow cylindrical tank 4 which has a large cross section so as to form a reservoir for the mercury 5 which forms the measuring liquid of the manometer. Piping 6 communicates with a barrel 7 which in turn communicates with the bottom end of a long glass tube 8 in which the other free surface of the mercury travels to provide an indication of the pressure to be measured. Figure 4 shows that tube 8 has on its front and rear etched lines or markings 9. By viewing the corresponding front and rear markings through the transparent walls of tube 8 horizontally aligned gauge markings are provided. This provides an accurate reading and prevents errors due to parallax.

On the free surfaces of the mercury within tube 8 is a float 10. Float 10 may conveniently be a steel ball which has been treated to have a blue outer surface. The dimensions of the inner diameter of tube 8 and of the diameter of float 10 are such that the adhesion between the mercury and the walls of the tube and of the float and the cohesion of the mercury causes an upward projection or meniscus of the mercury in the shape of a ring which centers the float 10 out of contact with the inner walls of the tube 8.

The upper end of tube 8 is received by a second hollow barrel 11 which in turn communicates with a T or pipe fitting 12 to which is connected a second flexible tube 13 whose opposite end is parallel to the end of flexible tube 1.

A housing is provided in which the other parts of the meter are enclosed and supported. This housing or cabinet is made up of a box-shaped rear and side portion 14 to which is attached a front plate 15 through which there is a narrow, vertically-extending slot 16. Slot 16 extends parallel to and adjacent tube 8 so that the tube 8 is visible through it. The narrow width of slot 16 and the distance between tube 8 and the front of the casing eliminate reflection of outside light from the surface of tube 8. Slot 16 may be closed by a plate of transparent plastic 17.

Behind and adjacent tube 8 there is mounted in housing 14 a ground glass 18 formed by a vertically-extending sheet behind and adjacent tube 8. Ground glass 18 is ground on one side with a fine even grain. The top and bottom edges of ground glass 18 are covered with a strip of opaque tape 19 to exclude light from entering the ends of the ground glass sheet.

Within housing 14 there is provided a baffle wall 20 of opaque material. Also within housing 14 is mounted a tubular, fluorescent electric lamp 21 which serves as a light source. Fluorescent light 21 is mounted in suitable sockets and is connected by wires with a starter, a ballast or transformer and a manually-operable switch so that lamp 21 can be operated from the ordinary commercial 110 volt A. C. circuit.

Because of baffle wall 20, the light from lamp 21 can not pass directly to slot 16 nor to tube 8. Instead the inner surfaces of the housing 14 are painted with a suitable reflecting paint. Gray has been found to be a satisfactory color. Light is thus reflected from lamp 21 through ground glass 18 where it gives a soft diffused light which permits accurate observation of the relative location of the top of the mercury column and the aligned front and rear gauge marks 9. Or as shown, the diffused light from the ground glass 18 permits accurate observation of the top or other edge of float 10 and the corresponding front and rear markings 9 with which it is aligned.

Housing 14 is mounted on three legs. The back leg 22 is fixed to the housing 14 as by welding.

The two front legs 23 have screw threaded portions which cooperate with interfitting screw threaded portions of the housing 14. Each of legs 23 has a knurled flange 24 by means of which the leg can be rotated to screw or unscrew the cooperating threads and thereby shorten or lengthen the leg so that the housing 14 may be placed in exact level position.

The operation of the manometer of this invention is as follows:

If the pressure to be measured is above atmospheric, it may be applied to tube 1. If a sub-amospheric pressure or vacuum is to be measured, it may be applied to tube 13. If a differential pressure is to be measured, the high side is connected to tube 1 and the low side to tube 13. In any case the free surface of the mercury rises in tube 8. Because the outside surface of tube 8 is shielded by the casing 14 and front plate 15 from the outside surface of tube 8, no reflections are given off from this surface. Likewise, the ground glass 18 gives a soft diffused light against which the upper surface of the mercury column or the outline of the float 10 appears as a sharp black shadow. This permits the upper surface of the mercury column or one edge of the float 10, preferably the top edge, to be read against one horizontally aligned pair of gauge marks 9. This permits an operator to use this gauge all day long for a series of measurements easily, accurately and without any eye strain because there is no glare nor reflections.

While in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

As an example, tube 8 may have an internal diameter of 10.4 millimeters and ball 10 an outer diameter of 9.5 mm.

Having now described our invention what we claim as new and desire to secure by Letters Patent is as follows:

1. A manometer including, a long tube of transparent material forming part of a substantially U-shaped conduit adapted to contain a measuring liquid, inlet and outlet connections to the ends of said conduit for applying the pressure to be measured to the measuring liquid in the conduit, a cabinet of opaque material totally enclosing said conduit and having a narrow slot through one wall aligned with said tube and through which said tube may be observed, an elongated light source in said cabinet parallel to said tube, a baffle wall of opaque material interposed between said tube and said light source so as to shut off the direct rays of light from said tube and from the slot in said cabinet and to reflect said rays, and a pane of ground glass behind said tube and in the path of travel of the reflected rays of light from said source to the tube and the slot.

2. A mercury column including, a long vertical glass tube, a U-shaped member connected at one end to the bottom of said tube, a reservoir having a large horizontal dimension communicating with the other end of said U-shaped member, a housing enclosing said tube and having a vertically-extending narrow slot opposite said tube through which said tube is visible, a float movable along said tube, mercury in said tube supporting said float on a free surface, a ground glass plate within said housing and behind said tube, and an elongated light source in said housing and shielded so that its rays can not pass directly to said slot or to said tube but are reflected from the inner walls of said housing through said ground glass and through or around said tube and out of said slot.

3. A pressure gauge including, a long vertical glass tube having lines etched on its front and rear surfaces to provide a series of horizontally aligned gauge marks, a hollow barrel communicating with the lower end of said tube, piping extending sidewise from said barrel, a tank communicating with said piping and having a larger cross section than said tube or said barrel or said piping, a supply of mercury in said tube and said barrel and said piping and said tank, said mercury having a free surface in said tube and a free surface in said tank, a fitting forming an inlet connection for pressure and communicating with said tank above the free surface of the mercury in said tank, a baffle in said fitting having a smaller cross section than said tube or said barrel or said piping or said tank and thereby preventing the escape of mercury from said tank when the pressure to be measured is shut off, a steel sphere floating on the free surface of the mercury in said tube, the diameter of said float and the internal diameter of said tube being so proportioned that the adhesion of the mercury to the walls of the tube and of the float and the cohesion of the mercury centers the float in the tube without contact with the walls of the tube, a housing in which the remaining parts of the instrument are mounted, said housing having in its front surface a vertically-extending narrow slot through which said tube can be observed, a vertically-extending sheet of ground glass in said housing behind said tube and aligned with said slot, an elongate fluorescent electric lamp in said housing, and an opaque baffle wall in said housing between said electric lamp and said slot and said tube whereby the direct light from the electric lamp is cut off from said slot and said tube but is reflected from the inner walls of said housing through said ground glass through or around said tube and the float therein.

JOHN V. HART.
EARL E. LAKJER.

References Cited in the file of this patent

UNITED STATES PATENTS

| Number | Name | Date |
|---|---|---|
| 1,139,519 | Haseltine | May 18, 1915 |
| 1,147,995 | Wilkinson | July 27, 1915 |
| 1,157,331 | Sheldon | Oct. 19, 1915 |
| 1,345,799 | Moyer | July 6, 1920 |
| 1,616,522 | Westcott | Feb. 8, 1927 |
| 1,722,469 | Jones | July 30, 1929 |
| 1,811,178 | Ireland | June 23, 1931 |
| 2,174,700 | Kellog | Oct. 3, 1939 |
| 2,347,861 | Winton | May 2, 1944 |
| 2,357,745 | Kliever | Sept. 5, 1944 |
| 2,451,460 | Winton | Oct. 19, 1948 |

FOREIGN PATENTS

| Number | Country | Date |
|---|---|---|
| 291,676 | Great Britain | June 7, 1928 |
| 342,757 | Great Britain | Aug. 5, 1930 |